Patented Oct. 25, 1949

2,485,605

UNITED STATES PATENT OFFICE 2,485,605

GRAIN FUMIGANT

Jonas Kamlet, New York, N. Y., assignor to Publicker Industries Inc., Philadelphia, Pa., a corporation of Pennsylvania No Drawing. Application November 23, 1946, Serial No. 711,831

3 Claims. (Cl. 99—225)

1

The present invention relates to new and useful insecticides, particularly such to be used as grain fumigants, and it more particularly relates to certain compositions for controlling insect infestation in stored grain, seeds, and milled food materials, and to a method for the treatment of such materials with the fumigants in question.

The magnitude of the losses caused by insects injurious to stored grain and milled products is tremendous. Cotton and Frauenfeld (U. S. Department of Agriculture Circular No. 720, pp. 1-2) estimate that in the United States alone these losses amount to at least 300,000,000 dollars annually. Thus, the problems of controlling insect infestation in grain, seeds, milled food materials, and the like is of utmost importance, and improvements in the art of insecticides which are useful for the indicated purpose are highly desirable.

Many volatile, low boiling organic compounds have been suggested and used industrially as grain fumigants. The most important of them are ethylene dichloride, liquid hydrocyanic acid, carbon disulfide, carbon tetrachloride, chloropicrin, ethylene oxide, methyl bromide, and trichloroethylene (U. S. Dept. of Agriculture, "Agricultural Statistics," 1942, 690).

It is one object of the present invention to provide new and improved grain fumigants which are toxic to insect life, even in low concentrations but relatively non-toxic to humans and domestic animals. It is a further object of the present invention to provide new fumigants which by their typical odor, will warn of their presence at concentrations below those which may prove injurious to the user, so that, generally, no odorous or lachrymatory addition will be necessary as a warning means.

A further object of the present invention is to provide grain fumigants which do not undesirably affect the germination characteristics of seeds treated therewith, and which, in the concentration employed, will have little or no corrosive action on metal which it may come in contact with. Still another object of the present invention is to provide grain fumigants in liquid form which can be produced from inexpensive and readily available raw materials in a simple manner, and which can be applied to stored grain, seeds, milled products, and the like, by simply spraying, sprinkling or pouring the easily volatile liquid fumigants over the stored materials. Other objects and advantages of the present invention will become obvious from the following description and appended claims.

2

The present invention comprehends insecticides which contain crotyl chloride (gamma-methallyl chloride) and mixtures of crotyl chloride with alpha-methyallyl chloride as an effective agent.

I have found that the novel fumigants of the present invention are highly active, fast acting and volatile fumigants and are suitable for use in the control of stored grain, seeds, flour, and the like, against infestation. A wide assortment of insect life can be controlled by these means, including those pests which cause the greatest economic losses, e. g. *Tribolium confusum* and *Tribolium castaneum*.

Alpha-methallyl chloride is a colorless liquid with a molecular weight of 90.6, specific gravity (20°/4°) 0.898, weight per gallon 7.48 lbs., B. P. 64°-65° C. at atmospheric pressure, and refractive index ($n_D^{20}$) 1.4149. Crotyl chloride or gamma-methallyl chloride is a colorless liquid with a molecular weight of 89.5, specific gravity (20°/4°) 0.928, weight per gallon 7.73 lbs., B. P. 84°-85° C. at atmospheric pressure, and refractive index ($n_D^{20}$) 1.4350. Both isomers have a characteristic odor and are easily recognizable by it, particularly when volatilized in confined areas.

These isomeric methallyl chlorides respectively may be prepared by the reaction of butadiene with hydrogen chloride in a polar medium, such as water, acetic acid, methanol, ethanol, and so on. Since butadiene is readily available today in a state of high purity and at low cost, the fumigant compositions of the present invention can be produced relatively simply and inexpensively.

In the reaction of butadiene with hydrogen chloride an equilibrium mixture containing about 30% to 35% of alphamethallyl chloride and 70%-65% of crotyl chloride is obtained according to the following equation:

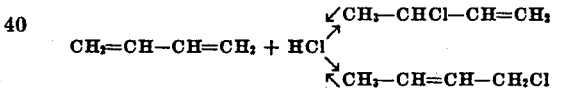

The product mixture is a colorless to light brown liquid of the specific gravity (20°/4°) 0.917 to 0.919 and a weight per gallon of 7.61 lbs. The two isomers can readily be separated from one another. As their boiling points are sufficiently far apart, this separation can efficiently be carried out by simple fractionation.

The tests on the efficiency of these compounds as fumigants were conducted in empty 20 liter glass flasks for an exposure of 24 hours at 80° F. The confused flour beetle (*Tribolium confusum*) was used as the test insect.

With alpha-methallyl chloride it was found that 0.012 cc. per liter killed all the insects in 24 hours at 80° F. With the crotyl chloride, however, only 0.004 cc. per liter were required to kill all the insects in the same time and at the same temperature. The crotyl chloride thus unexpectedly proves to be three times as toxic as the alpha isomer. This fact is truly surprising and would not be predicted as, generally, isomers in equilibrium with one another have closely comparable characteristics.

As a further surprising and completely unexpected result, it has been found that even the equilibrium mixture of alphamethallyl chloride (30–35%) and crotyl chloride (70–65%) gives a 100% kill in 24 hours at 80° F. at a concentration of 0.004 cc. per liter. In other words, the equilibrium mixture has proved to be just as toxic as the more toxic of its two components. This is undoubtedly due to synergy, a phenomenon sometimes encountered in mixtures of insecticides. If the toxicity of the mixture were simply the sum of the relative toxicities of the two components, the equilibrium mixture would give a 100% kill with no less than 0.005 cc. per liter. As, however, the actual toxic dose of the mixture is found to be 0.004 cc. per liter, the toxicity of the mixture is at least 125% as great as the calculated value.

The unseparated equilibrium mixture being just as toxic as the more toxic of its components, this mixture may be used as such for a grain fumigant or the like, without the necessity of submitting it to prior fractionation in order to recover the more toxic of the two components. At the same time it is possible in this way to utilize the alpha methallyl chloride (necessarily produced with the crotyl chloride) in a very advantageous manner. In this way, the manufacturing costs for the fumigant are considerably lowered.

Only where a liquid insecticide or fumigant of uniform volatility is required, does the gamma isomer, i. e. the crotyl chloride need to be separated by fractionation, or the like, for its use in a fumigant, etc. Thus, while the equilibrium mixture boils over the wide range of 64° to 86° C., the crotyl chloride boils sharply at 84–85° C.

It is interesting that the third isomer, the beta-methallyl chloride, in concentrations of 0.0118 cc. per liter, gives only a 95% kill of *Tribolium castaneum* (the red flour beetle) in 24 hours at 86° F. (Richardson and Walkden, Journal of Economic Entomology, vol. 38, No. 4, pp. 471–7, (1945), though the red flour beetle is almost equal in susceptibility to fumigants with the confused flour beetle. The dosage required for a 100% kill, thus, would be substantially larger for the beta isomer than for the alpha isomer.

The fumigants of the present invention may contain diluents or admixtures of other agents chemically compatible with the methallyl chlorides, or these effective fumigating means may be emulsified with said agents or diluents. Also such agents may be used in this manner which possess an insecticidal activity for themselves. Typical diluents of this kind are for instance: carbon tetrachloride, carbon disulfide, trichlorethylene, ethylene chlorobromide, propylene dibromide, propylene chlorobromide, trichloroacetonitrile, 1,1-dichloronitroethane, chloropicrin, and so on.

Alternatively the effective toxicants of the fumigants of the present invention may be diluted or emulsified with less volatile carriers, such as light petroleum distillates, white oils, solvent naphtha, o-dichlorobenzene, tetralin, and the like. In the use of such compositions, the active toxicant is volatilized gradually over a protracted period of time.

The amounts of the effective toxicants of the insecticide or fumigant compositions of the present invention required in commercial practice may vary widely, depending on the humidity content of the product to be fumigated, the temperature, the degree of infestation, the mode and duration of storage, the method of application, and other factors. Dosages from 0.10 to 3.0 cc. per cubic foot of storage space will usually be found to accomplish a complete kill of all infesting insects. These proportions, however, may vary, however, under different conditions of use.

The fumigant mixtures may, for instance, be sprayed, sprinkled or poured over the top of a bin of stored grain, seed, or other material to be treated, or they may be applied across a moving belt of grain, seed, or the like prior to storage, or they may be injected into a bin or silo with a stirrup pump, or they may be applied in other ways known in the art.

The fumigants of the present invention are suitable for use as volatile insecticides, as soil fumigants, and wherever a material which is highly toxic to insect life but possessed of low toxicity to men and domestic animals is to be used.

The following examples are given to illustrate the invention but in no way to confine or limit it; modifications and improvements being obvious to those skilled in the art.

*Example 1*

Crotyl chloride used in a fumigant mixture is 100% effective against *Tribolium confusum* at all levels of stored wheat when sprayed on the surface of the wheat in an amount corresponding to 0.20 cc. of crotyl chloride per cubic foot.

*Example 2*

A fumigant composition containing an equilibrium mixture of 35% alpha-methallyl chloride and 65% crotyl chloride sprayed on the surface of stored corn in an amount corresponding to 0.15 cc. of the equilibrium mixture per cubic foot kills 100% of *Tribolium confusum* present at all levels of the stored corn.

*Example 3*

A mixture of 10% of crotyl chloride and 90% of carbon tetrachloride kills 100% of *Tribolium confusum* in stored grain when sprayed on its surface in an amount corresponding to 2.5 cc. per cubic foot.

*Example 4*

15% of an equilibrium mixture of 35% alpha-methallyl chloride and 65% of crotyl chloride (as obtained by reacting butadiene with hydrogen chloride) bended with 85% of carbon tetrachloride, kills *Tribolium confusum* completely in stored grain when sprayed on its surface in an amount corresponding to 2.0 cc. per cubic foot.

*Example 5*

Corresponding results are obtained against other injurious insects, such as *Tribolium castaneum* and the like, their larvae and eggs, and by the use of other mixtures or emulsions containing crotyl chloride either alone or in mixture with alpha-methallyl chloride as the main effective ingredient.

Having thus described my invention, I claim as new and desire to protect by Letters Patent:

1. A method for controlling insects and related parasites, comprising exposing such organisms, their larvae and eggs to the vapor of a fumigant containing crotyl chloride as an essential ingredient.

2. A method for controlling insects and related parasites, comprising exposing such organisms, their larvae and eggs to the vapor of a fumigant containing crotyl chloride and alpha-methallyl chloride as essential ingredients.

3. A method for controlling insects and related parasites in stored grain, seeds, and milled food products, comprising spraying a liquid containing crotyl chloride on the surface of the stored material.

JONAS KAMLET.

REFERENCES CITED

The following references are of record in the file of this patent:

UNITED STATES PATENTS

| Number | Name | Date |
|---|---|---|
| 2,123,504 | Dykstra | July 12, 1938 |
| 2,425,238 | Fletcher et al. | Aug. 5, 1947 |

FOREIGN PATENTS

| Number | Country | Date |
|---|---|---|
| 103,206 | Australia | Feb. 7, 1938 |